Jan. 21, 1947.   K. M. ROMICK   2,414,611
MANUFACTURE OF RUBBER GOODS FROM LATEX
Filed Sept. 29, 1943

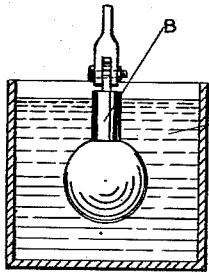

COAGULANT SOLUTION
CONTAINING A METALLIC
ACTIVATOR OF VULCANIZATION
AND SUFFICIENT ALIPHATIC
QUATERNARY AMMONIUM
BASE TO PRODUCE
A pH OF 1.5 TO 7.5.

FIG-1

LATEX CONTAINING
VULCANIZING INGREDIENTS
BUT INSUFFICIENT
METALLIC ACTIVATOR
FOR VULCANIZATION.

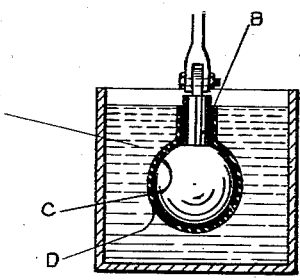

FIG-2

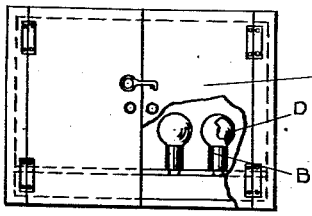

DRYING AND VULCANIZING
OVEN.

FIG-3

Inventor
Kenneth M. Romick
By Nora S. Woodruff
Atty

Patented Jan. 21, 1947

2,414,611

UNITED STATES PATENT OFFICE 2,414,611

MANUFACTURE OF RUBBER GOODS FROM LATEX

Kenneth M. Romick, Akron, Ohio, assignor to American Anode Inc., Akron, Ohio, a corporation of Delaware Application September 29, 1943, Serial No. 504,302

12 Claims. (Cl. 18—58)

This invention relates to the manufacture of rubber goods from latex and analogous aqueous dispersions of rubber and rubbery materials, particularly those that are vulcanizable, and to an improved coagulant composition for use in the manufacturing process.

It has become common practice in the rubber manufacturing art to make rubber goods from aqueous dispersions of rubber or rubbery materials, such as latex, by coating a deposition base, such as a shaped form, with a latex coagulant and then associating the coated base with the latex. The coagulant thereupon coagulates the latex and builds up a deposit of rubber coagulum on the base. This rubber coagulum can be dried and vulcanized.

Ordinarily, the latex used in such processes is a compounded latex containing all ingredients necessary for vulcanizing the deposited rubber coagulum. In many cases, however, it has been found undesirable to add to the latex the metallic activator, such as zinc, necessary to effect complete vulcanization as these activators have a destabilizing action on the latex and frequently cause the compounded latex to coagulate in the storage container. In order to eliminate this it was proposed, in U. S. Patent No. 2,006,862, to utilize a compounded latex containing all compounding ingredients save the metallic activator, and to supply such activator by adding it to the latex coagulant. The activator then enters the rubber coagulum by diffusion and reacts with the ammonium hydroxide in the ammonia-preserved latex to form the insoluble metallic hydroxide. On heating to vulcanize the rubber the metallic hydroxide will be converted to the insoluble oxide.

This process, however, does not lend itself readily to commercial operations in all instances as the alkalinity of the latex must be maintained at a relatively high value in order to insolubilize the metallic activator. If the alkalinity of the latex is permitted to drop the tensile strength, elongation, aging characteristics, and general quality of the rubber also drops, due to improper vulcanization caused by the lack of an adequate quantity of metallic activator in the rubber coagulum. Also, in many cases the zinc compound may be precipitated so rapidly by the ammonia that unsightly blotches of white zinc compound are produced on the rubber.

In an effort to eliminate these difficulties it was proposed, in U. S. Patent No. 2,261,165, that the latex, instead of being preserved with ammonia, be preserved with an alkanolamine such as triethanolamine. The purpose there was to provide a compound having a weakly basic reaction in solution and use it to preserve and stabilize the latex. With the alkanolamines the pH of the latex can be raised to the desired high value and will remain there since there are no evaporation losses as is the case with ammonia. Also, precipitation of the zinc compound is not objectionably rapid. Although this method provides a sufficient amount of metallic activator satisfactorily distributed in the rubber, it was found that when working with latex having a high pH value the rate of coagulation is undesirably slow, so that considerable time is lost in waiting for the deposit of rubber to build up on the deposition base. As can readily be appreciated, such loss of time is a very important factor in commercial operations.

I have discovered that these difficulties with the prior processes may be minimized and substantially eliminated by adding to the usual coagulant composition containing a metallic activator an aliphatic quaternary ammonium base in a controlled quantity adequate to impart to the composition a pH within the range 1.5 to 7.5, and preferably in the neighborhood of 2.0. Then the activator diffuses readily into the latex coagulum and, on vulcanization, a rubber is produced having the desired high tensile strength, desired elongation, superior aging qualities, and other improved physical properties.

A preferred embodiment of the invention is illustrated in the accompanying drawing in which the several figures are conventionalized elevational views sectioned for clarity and showing principal steps in a process of the invention.

Thus, a form or deposition base B is immersed (Fig. 1) in a coagulant solution which contains a metallic activator of vulcanization together with sufficient aliphatic quaternary ammonium base to impart to the solution a pH of from 1.5 to 7.5. The form B is withdrawn from the coagulant solution and dried in air sufficiently to provide a coating C of the solute material on the form after which the coated form is dipped (Fig. 2) into a compounded latex which, as indicated by the legend, contains vulcanizing ingredients but insufficient metallic activator for vulcanization of the rubber contained in the latex. A deposit of rubber coagulum D builds up on the form by action of the coagulant on the latex and at the same time metallic activator of vulcanization (which may be the same material as the coagulant) diffuses from the coating C into the deposit D in quantities adequate to supply the deficiency of activator therein and to effect vulcanization of the rubber. The form B with the deposit of rubber coagulum D then is placed in an oven or other conventional apparatus for drying and vulcanizing the rubber in the usual way as is illustrated in Fig. 3.

The compounded latex to be used with the improved coagulant compositions may be the ordinary ammonia-preserved latex of commerce or other appropriate latex compounded with the usual materials including sulfur, vulcanization accelerators, age-resisters, and the like, but should preferably contain very little or none of the metallic activators necessary for vulcanization. The latex will be more stable if it contains no metallic activator at all.

The improved coagulant composition of this invention should contain the usual solvents, coagulating chemicals, and wetting agents, all as set out in U. S. Patent 1,996,090, and metallic activators as disclosed in the hereinabove mentioned U. S. Patent No. 2,006,862. In many cases, a single material may function both as a coagulant and as a metallic activator. The metallic activators include water-soluble salts of cadmium, lead, magnesium, or zinc, such as cadmium acetate, formate, chloride and nitrate; lead acetate, formate, and nitrate; magnesium acetate, formate, chloride, and nitrate; and zinc acetate, formate, chloride and nitrate. By far the most important of these are the zinc salts which are also excellent coagulants. These activators may be used alone as the coagulating chemical or they may be used in combination with other coagulating chemicals such as calcium nitrate.

The active constituents of the coagulant composition, including the metallic activator, are usually acidic in character. Sufficient aliphatic quaternary ammonium base should be added to overcome this acidity and raise the pH of the composition to the specified value. The usual constituents that are acidic in character include the metallic activators such as zinc nitrate, the coagulating chemicals such as calcium chloride, and the wetting agents such as butyl lactate and lactic acid. In any particular coagulant composition the worker skilled in the art can readily determine those chemical compounds that are acidic in character.

It has been found that the aliphatic quaternary ammonium base or bases should be added to the coagulant composition in an amount of from about 0.1% to about 4.0%, by weight, based on the total weight of those solutes in the coagulant composition that give an acid reaction in solution. In ordinary commercial practice this means that the coagulant composition will have a pH of from about 1.5 to about 7.5. Although this pH covers the range found useful in ordinary commercial practice it is possible to prepare a solution having the required weight ratio of quaternary ammonium base present but having a pH value outside the 1.5–7.5 range. This can be done, for example, by using either abnormally large or abnormally small amounts of solvent.

The quaternary ammonium bases used in this invention must be functionally aliphatic although they may have both aliphatic and aromatic substituents in the molecule so long as the aliphatic substituents predominate. Thus, the bases must have what is known as a functional aliphatic group. Among the aliphatic quaternary ammonium bases used in this invention are the tetraalkanolammonium bases which include tetramethanolammonium hydroxide, tetraethanolammonium hydroxide, tetrapropanolammonium hydroxide, and similar compounds. Other quaternary ammonium bases are also useful in the invention including tetramethylammonium hydroxide, tetraethylammonium hydroxide, and the like. Any of these bases can be used in the coagulant composition either alone or in combinations of two or more.

In making up a coagulant composition from a solvent and with coagulating chemicals, metallic activators, wetting agents, and quaternary ammonium bases dissolved therein, it is necessary that solutes be chosen that are mutually soluble so that none will cause the others to precipitate out of solution. It is also necessary to choose materials that will not harmfully react with each other when in solution. Owing to the great numbers of solvents and solutes from which a choice may be made this presents no difficult problem and such selection is well understood in the art. The solvent may be water or a volatile organic solvent such as alcohol or acetone as more fully disclosed in U. S. Patent No. 1,996,090.

In a specific example of the invention a coagulant composition is prepared consisting of 1000 cc. of denatured alcohol, 200 g. of zinc nitrate, 400 g. of calcium nitrate, 38 g. of lactic acid, 50 g. of ethyl lactate, and 15 g. of tetraethanolammonium hydroxide. A latex composition is prepared by mixing 100 parts by weight of rubber in the form of the centrifugally concentrated, ammonia-preserved latex of commerce and containing 60% total solids and 0.65% of ammonia, 1 part of sulfur, 0.3 part of an organic accelerator such as mercaptobenzothiazole, and 1.3 parts age-resister. A glazed porcelain glove form is then heated to about 140° F. and immersed momentarily in the coagulant solution, withdrawn, rotated in the air several minutes to distribute the coagulant composition evenly over the form and to permit evaporation of a major portion of the solvent. The form is then immersed in the latex composition for about 30 seconds and withdrawn with a deposit of latex coagulum. The coagulum is washed in running water, and then is dried and vulcanized according to the usual practice.

In the above specific example of the coagulant composition the alcohol serves as the solvent while the zinc nitrate serves as both a coagulating chemical and a metallic activator. Calcium nitrate is also used as an additional coagulating chemical. The lactic acid and ethyl lactate are both wetting agents employed to insure more even coverage of a deposition form by the coagulant solution, while the aliphatic quaternary ammonium base used here is tetraethanolammonium hydroxide. As explained in detail hereinabove each of the constitutents of the specific coagulant composition may be substituted by any of a number of equivalents so long as an aliphatic quaternary ammonium base is present in the proper amount.

Although the coagulant compositions disclosed herein are especially useful for depositing latex containing no metallic activator, they are also useful with the ordinary commercial latices in which some activator is present. It is very difficult to compound latex with the maximum amount of activator due to its destabilizing effect on the latex. Latex compounded with an amount of activator necessary for good vulcanization must be used in a very short time, before coagulation sets in, or it must contain such a large amount of stabilizer that rubber goods of inferior quality are produced. In commercial operations in the past it has been customary to add to the latex some activator, together with stabilizing agents, and to use the latex in deposition processes. Thus even with this latex, which contains some activator, the rubber may be improved due to the additional amount of activator that can be diffused into the rubber by using the coagulant compositions of this invention.

The coagulant compositions of this invention may be used to introduce water-soluble compounds of cadmium, lead, magnesium, zinc, and the like into aqueous dispersions of rubbery materials in which vulcanization is attained by means of substances other than sulfur. Thus with an aqueous dispersion of neoprene the zinc and magnesium which may serve as vulcanizing agents may be diffused into the neoprene coagulum by first putting them in the coagulant composition, as set out in this invention. The terms "vulcanization" and "activator of vulcanization" accordingly are used herein in a broad sense to contemplate all the various types of vulcanization unless otherwise specifically indicated. Likewise the metallic compounds of cadmium, lead, magnesium, and zinc may be introduced into aqueous dispersions of rubbery materials for purposes other than their beneficial effect on vulcanization.

The term "aqueous dispersion of rubbery material" as used herein includes all naturally occurring and artificially prepared dispersions of natural or synthetic rubber, such as natural rubber latex, artificial dispersions of natural, reclaimed, or synthetic rubber, and synthetically produced dispersions of synthetic rubbers such as, for instance, the various butadiene type rubbers, neoprene, and the like. The aqueous dispersions may be concentrated, diluted, thickened, thinned, or otherwise modified, and may contain any of the usual compounding and conditioning materials, except as otherwise specifically indicated.

Having disclosed my invention as exemplified by lists of representative compounds and a specific example of the invention, it is my desire that the invention be not limited to these details but rather construed broadly within its spirit and scope as indicated by the accompanying claims.

I claim:

1. The method of making vulcanized rubber goods and the like which comprises preparing an aqueous dispersion of rubbery material containing vulcanizing ingredients but insufficient metallic activator to effect vulcanization of the rubbery material, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount corresponding to substantially from 0.1% to 4.0% by weight of said solute material having an acid reaction in solution, whereby the pH of said composition is raised to at least 1.5, associating at least the solute material of said composition with said dispersion to produce a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

2. The method of making vulcanized rubber goods and the like which comprises preparing an aqueous dispersion of rubbery material containing vulcanizing ingredients but insufficient metallic activator to effect vulcanization of the rubbery material, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount corresponding to substantially from 0.1% to 4.0% by weight of said solute material having an acid reaction in solution, whereby the pH of said composition is raised to at least 1.5, applying said composition to a deposition base, at least partially drying the composition on the base, associating the prepared base with said dispersion to deposit on the base a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

3. The method of making vulcanized rubber goods and the like which comprises preparing an aqueous dispersion of rubbery material containing vulcanizing ingredients but insufficient metallic activator to effect vulcanization of the rubbery material, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount sufficient to impart to said composition a pH value of substantially from 1.5 to 7.5, associating at least the solute material of said composition with said dispersion to produce a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

4. The method of making vulcanized rubber goods and the like which comprises preparing an aqueous dispersion of rubbery material containing vulcanizing ingredients but insufficient metallic activator to effect vulcanization of the rubbery material, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount sufficient to impart to said composition a pH value of substantially from 1.5 to 7.5, applying said composition to a deposition base, at least partially drying the composition on the base, associating the prepared base with said dispersion to deposit thereon a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

5. The method of making vulcanized rubber goods and the like which comprises preparing an aqueous dispersion of rubbery material containing vulcanizing ingredients but insufficient metallic activator to effect vulcanization of the rubbery material, separately preparing a composition comprising a solvent having dissolved therein solute material having an acid reaction in solution and being present in quantity sufficient normally to impart to said composition a pH below 1.5, said solute material including a polyvalent metal salt coagulant for said dispersion and a water-soluble metallic activator of vulcanization in quantity sufficient to overcome the deficiency thereof in said dispersion and to effect vulcanization of the rubbery material, said composition also containing an aliphatic quaternary ammonium base in an amount sufficient to impart to said composition a pH value of substantially from 1.5 to 7.5, applying said composition to a deposition base, at least partially drying the composition on the base, associating the prepared base with said dispersion to deposit thereon a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

6. The method of making vulcanized rubber goods and the like which comprises preparing an aqueous dispersion of rubbery material containing vulcanizing ingredients but insufficient metallic activator to effect vulcanization of the rubbery material, separately preparing a composition comprising a solvent having dissolved therein solute materials, including a polyvalent metal salt coagulant for said dispersion, a wetting agent and a water-soluble metallic activator of vulcanization in quantity sufficient to overcome the deficiency thereof in said dispersion and to effect vulcanization of the rubbery material, said solute materials having an acid reaction in solution and being present in quantity sufficient normally to impart to said composition a pH below 1.5, said composition also containing an aliphatic quaternary ammonium base in an amount sufficient to impart to said composition a pH value of substantially from 1.5 to 7.5, applying said composition to a deposition base, at least partially drying the composition on the base, associating the prepared base with said dispersion to deposit thereon a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

7. The method of making vulcanized rubber goods and the like which comprises preparing an aqueous dispersion of rubbery material containing some vulcanizing ingredients but substantially no metallic activator of vulcanization, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount corresponding to substantially from 0.1% to 4.0% by weight of said solute material having an acid reaction in solution, whereby the pH of said composition is raised to a value substantially above 1.5, associating at least the solute material of said composition with said dispersion to produce a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

8. The method of making vulcanized rubber goods and the like which comprises preparing an aqueous dispersion of rubbery material containing some vulcanizing ingredients but substantially no metallic activator of vulcanization, separately preparing a composition having the property of coagulating said dispersion and comprising a solvent and solute material having an acid reaction in solution and being present in quantity sufficient normally to impart to said composition a pH below 1.5, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount sufficient to impart to said composition a pH value of substantially from 1.5 to 7.5, associating at least the solute material of said composition with said dispersion to produce a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

9. The method of making vulcanized rubber goods and the like which comprises preparing an aqueous dispersion of rubbery material containing vulcanizing ingredients but insufficient metallic activator to effect vulcanization of the rubbery material, separately preparing a composition having the property of coagulating said dispersion and comprising a solvent and solute material having an acid reaction in solution and being present in quantity sufficient normally to impart to said composition a pH substantially below 2.0, said solute material including a water-soluble metallic activator of vulcanization in quantity sufficient to overcome the deficiency thereof in said dispersion and to effect vulcanization of the rubbery material, said composition also containing an aliphatic quaternary ammonium base in an amount sufficient to raise the pH of said composition to a value of about 2.0, associating at least the solute material of said composition with said dispersion to produce a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

10. The method of making vulcanized rubber goods and the like which comprises preparing an aqueous dispersion of rubbery material containing some vulcanizing ingredients but substantially no metallic activator of vulcanization, separately preparing a composition comprising a solvent having dissolved therein solute material having an acid reaction in solution and being present in quantity sufficient normally to impart to said composition a pH substantially lower than 2.0, said solute material including a polyvalent metal salt coagulant for said dispersion and a water-soluble metallic activator of vulcanization in quantity sufficient to overcome the deficiency thereof in said dispersion and to effect vulcanization of the rubbery material, said composition also containing an aliphatic quaternary ammonium base present in an amount sufficient to raise the pH of said composition to a value of about 2.0, applying said composition to a deposition base, at least partially drying the said composition on said base, associating the base so prepared with said dispersion to deposit thereon a coagulum of said rubbery material, and drying and vulcanizing the rubbery material of said coagulum, the said rubbery material of said coagulum containing adequate metallic activator for vulcanization by reason of deposition therein of such activator supplied thereto from said composition.

11. In the manufacture of vulcanized rubber goods and the like from an aqueous dispersion of rubbery material in which the presence of metallic compounds promoting vulcanization of the rubbery material is undesirable in the dispersion but desirable in the solid rubbery material obtained from the dispersion, the method which comprises preparing an aqueous dispersion of said rubbery material in condition to be vulcanized by heating in the solid form but for a deficiency of said metallic compounds therein, separately preparing a composition having the property of coagulating said dispersion and comprising a solvent and solute material having an acid reaction in solution and being present in quantity sufficient normally to impart to said composition a pH below 1.5, said solute material including a water-soluble metallic compound having the property of promoting vulcanization of said rubbery material and being present in quantity sufficient to supply the deficiency thereof in said dispersion, said composition also containing an aliphatic quaternary ammonium base in an amount corresponding to substantially from 0.1% to 4.0% by weight of said solute material having an acid reaction in solution, whereby the pH of said composition is raised to at least 1.5, associating at least the solute material of said composition with said dispersion to produce a coagulum of said rubbery material, and drying and vulcanizing the rubbery material of said coagulum, the said rubbery material of said coagulum containing adequate metallic compound for vulcanization by reason of deposition therein of such metallic compound supplied thereto from said composition.

12. In the manufacture of vulcanized rubber goods and the like from an aqueous dispersion of rubbery material in which the presence of metallic compounds promoting vulcanization of the rubbery material is undesirable in the dispersion but desirable in the solid rubbery material obtained from the dispersion, the method which comprises preparing an aqueous dispersion of said rubbery material in condition to be vulcanized by heating in the solid form but for a deficiency of said metallic compounds therein, separately preparing a composition having the property of coagulating said dispersion and comprising a solvent and solute material having an acid reaction in solution and being present in quantity sufficient normally to impart to said composition a pH below 1.5, said solute material including a water-soluble metallic compound having the property of promoting vulcanization of said rubbery material and being present in quantity sufficient to supply the deficiency thereof in said dispersion, said composition also containing an aliphatic quaternary ammonium base in an amount sufficient to impart to said composition a pH value of substantially from 1.5 to 7.5, associating at least the solute material of said composition with said dispersion to produce a coagulum of said rubbery material, and drying and vulcanizing the rubbery material of said coagulum, the said rubbery material of said coagulum containing adequate metallic compound for vulcanization by reason of deposition therein of such metallic compound supplied thereto from said composition.

KENNETH M. ROMICK.